US012618807B2

(12) United States Patent
Al Brahim et al.

(10) Patent No.: US 12,618,807 B2
(45) Date of Patent: May 5, 2026

(54) HALF RING GEAR MECHANISM FOR ULTRASOUND INSPECTION

(71) Applicant: SAUDI ARABIAN OIL COMPANY, Dhahran (SA)

(72) Inventors: Ahmed Al Brahim, Thuwal (SA); Fadl Abdellatif, Thuwal (SA); Hesham Jifri, Thuwal (SA); Hassane Trigui, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 380 days.

(21) Appl. No.: 18/318,937

(22) Filed: May 17, 2023

(65) Prior Publication Data

US 2024/0385144 A1      Nov. 21, 2024

(51) Int. Cl.
| | |
|---|---|
| *G01N 29/22* | (2006.01) |
| *G01N 29/04* | (2006.01) |
| *G01N 29/265* | (2006.01) |

(52) U.S. Cl.
CPC ........... *G01N 29/225* (2013.01); *G01N 29/04* (2013.01); *G01N 29/043* (2013.01);
(Continued)

(58) Field of Classification Search
CPC .... G01N 29/043; G01N 29/225; G01N 29/04; G01N 29/265
See application file for complete search history.

(56) References Cited

U.S. PATENT DOCUMENTS 3,921,440 A * 11/1975 Toth ..................... G01N 29/265
                                                              73/622
4,331,034 A * 5/1982 Takeda ................. G01N 29/265
                                                              73/637
(Continued)

FOREIGN PATENT DOCUMENTS

| CN | 103901105 A | 7/2014 |
|---|---|---|
| CN | 111289622 A | 6/2020 |

(Continued)

OTHER PUBLICATIONS

TWN Technology, "TWN-10 | Chain-link scanner for small pipe weld inspection," Youtube.com, Internet URL: <TWN-10 | Chain-link scanner for small pipe weld inspection—YouTube> (Dec. 16, 2021), 1 page.
(Continued)

*Primary Examiner* — Helen C Kwok
(74) *Attorney, Agent, or Firm* — Leason Ellis LLP

(57) ABSTRACT

An ultrasonic inspection device for a pipe or tube is provided and includes an arcuate shaped housing having an arcuate shaped guide slot. The arcuate shaped housing has a first end and an opposite second end spaced from the first end. A first driving gear assembly is disposed at the first end of the arcuate shaped housing and includes a first driving gear powered by a first motor. A second driving gear assembly is disposed at the second end of the arcuate shaped housing and includes a second driving gear powered by a second motor. An arcuate shaped driven gear, that supports ultrasonic testing (UT) probe assembly, travels within the arcuate shaped guide slot and is engaged at all times with at least one of the first driving gear and the second gear to permit the arcuate shaped driven gear to be driven in a 360 degree path around the pipe.

18 Claims, 6 Drawing Sheets

(52) U.S. Cl.
CPC ..... *G01N 29/265* (2013.01); *G01N 2291/023* (2013.01); *G01N 2291/2634* (2013.01)

(56) References Cited

U.S. PATENT DOCUMENTS

| | | | | |
|---|---|---|---|---|
| 4,375,165 | A | 3/1983 | De Sterke | |
| 4,387,598 | A * | 6/1983 | Jamieson | G01N 29/265 |
| | | | | 73/622 |
| 4,389,894 | A * | 6/1983 | Kajiyama | G01N 29/265 |
| | | | | 376/245 |
| 4,586,379 | A * | 5/1986 | Burkhardt, Jr. | G01N 29/265 |
| | | | | 73/637 |
| 4,672,852 | A * | 6/1987 | Gugel | G01N 29/265 |
| | | | | 376/245 |
| 4,767,048 | A * | 8/1988 | Kimbrough | G01N 29/265 |
| | | | | 104/165 |
| 5,313,837 | A | 5/1994 | Haynes | |
| 5,435,405 | A * | 7/1995 | Schempf | B62D 55/265 |
| | | | | 901/44 |
| 7,685,878 | B2 | 3/2010 | Brandstrom | |
| 7,950,298 | B2 | 5/2011 | Lavoie | |
| 9,404,773 | B2 | 8/2016 | Chang et al. | |
| 9,551,690 | B2 | 1/2017 | Gaudet et al. | |
| 2005/0056105 | A1 * | 3/2005 | Delacroix | G01N 29/043 |
| | | | | 376/249 |
| 2010/0275694 | A1 * | 11/2010 | Roberts | G01N 29/265 |
| | | | | 73/637 |
| 2012/0204645 | A1 * | 8/2012 | Crumpton | G01N 29/043 |
| | | | | 73/588 |
| 2013/0061664 | A1 * | 3/2013 | Boone | G01B 7/30 |
| | | | | 73/112.01 |
| 2019/0086020 | A1 * | 3/2019 | Wehlin | B25J 9/1664 |
| 2020/0174478 | A1 * | 6/2020 | Abdellatif | B62D 57/024 |
| 2023/0045635 | A1 | 2/2023 | Abdellatif et al. | |
| 2023/0058202 | A1 | 2/2023 | Abdellatif et al. | |

FOREIGN PATENT DOCUMENTS

| | | |
|---|---|---|
| EP | 0412396 A2 | 2/1991 |
| KR | 200406125 Y1 | 1/2006 |
| KR | 101407808 B | 6/2017 |
| KR | 101971350 B1 | 4/2019 |
| WO | 2015080535 A1 | 6/2015 |

OTHER PUBLICATIONS

Autsolutions CIRC-SCAN:https://autsolutions.net/ndt-products/ndt-scanners/manual-ndt-ut-scanners/circscan-pipe-weld-scanner/; Retrieved from Internet Jun. 8, 2023; 4 pages.

"Autsolutions Revolver: https://autsolutions.net/ndt-products/ndt-scanners/manual-ndt-ut-scanners/revolver/; Retrieved from Internet Jun. 6, 2023; 9 pages."

"Eddyfi Technologies; NDT Sweeper: https://eddyfi.com/en/product/ndt-sweeper; Retrieved from Internet Jun. 6, 2023; 4 pages."

Zetec Pipe Scanner Retrieved on Feb. 1, 2023 from: https://www.zetec.com/wp-content/uploads/2018/11/Zetec-Catalog.pdf; Retrieved Jun. 8, 2023; 242 pages.

* cited by examiner

HALF RING GEAR MECHANISM FOR ULTRASOUND INSPECTION

TECHNICAL FIELD

The present disclosure is directed to devices and systems for inspecting pipes and tubes and more particularly, to a half ring gear mechanism for ultrasound inspection capable of performing circumferential ultrasonic pipe inspection as well as being integrated with robotic crawlers and drones.

BACKGROUND

Corrosion is one of the main threats on the longevity of pipes causing them degrade and thin. Several industries, including the oil and gas, water treatment and distribution, suffer numerous losses due to pipe degradation as it can cause the fluids contained in the pipe to leak leading to loss of production and operations halt. It can also propose a danger on individuals working near these pipes especially if these pipes are containing hazardous chemicals. To combat corrosion, regular and frequent inspections are essential to monitor the integrity of the condition of the pipes. These inspections can be done by ultrasonic thickness.

One technique for testing is a non-destructive techniques (NDT) technique. In this technique, an ultrasonic sound is applied on the pipe and its response is used to determine the pipe thickness. The drawbacks of regular inspection are the large cost and high labor demand. These drawbacks are also intensified if the pipes are located in difficult to reach locations including high positions which commonly call for the use of scaffolding.

There is therefore a need for an improved ultrasonic inspection device that overcomes the above noted deficiencies.

SUMMARY

As mentioned above, the present disclosure is directed to an ultrasound inspection device for pipes and more specifically, is directed to a half ring gear mechanism for ultrasound inspection capable of performing circumferential ultrasonic pipe inspection as well as being integrated with robotic crawlers and drones.

In one embodiment, an ultrasonic inspection device for a pipe or tube is provided and includes an arcate shaped housing having an arcuate shaped guide slot. The arcuate shaped housing has a first end and an opposite second end spaced from the first end. A first driving gear assembly is disposed at the first end of the arcuate shaped housing. The first driving gear assembly includes a first driving gear powered by a first motor. A second driving gear assembly is disposed at the second end of the arcuate shaped housing. The second driving gear assembly includes a second driving gear powered by a second motor. An arcuate shaped driven gear travels within the arcuate shaped guide slot and is engaged at all times with at least one of the first driving gear and the second gear to permit the arcuate shaped driven gear to be driven in a 360 degree path around the pipe. An ultrasonic testing (UT) probe assembly is fixedly attached to the arcuate shaped driven gear and configured for direct contact with the pipe for performing ultrasonic inspection of the pipe or tube.

In another aspect, an ultrasonic inspection device for a pipe or tube includes an arcuate shaped housing having an arcuate shaped guide track. The arcuate shaped housing has a first lateral extension at a first end thereof and a second lateral extension at an opposite second end that is spaced from the first end. A first driving gear assembly is coupled to the first lateral extension of the arcuate shaped housing. The first driving gear assembly includes a first driving gear powered by a first motor. A second driving gear assembly is coupled to the second lateral extension of the arcuate shaped housing. The second driving gear assembly includes a second driving gear powered by a second motor. An arcuate shaped driven gear travels within the arcuate shaped guide track and is engaged at all times with at least one of the first driving gear and the second gear to permit the arcuate shaped driven gear to be driven in a 360 degree path around the pipe. In addition, an arcuate length of the arcuate shaped driven gear is greater than 180 degrees. The device further includes an ultrasonic testing (UT) probe assembly fixedly attached to the arcuate shaped driven gear and configured for direct contact with the pipe for performing ultrasonic inspection of the pipe or tube. In a first position, the arcuate shaped driven gear is disposed substantially within the arcuate shaped guide track and the ultrasonic testing (UT) probe assembly lies between the first and second ends and in a second position, the arcuate shaped driven gear is disposed substantially outside the arcuate shaped guide track and the ultrasonic testing (UT) probe assembly lies outside of the arcuate shaped housing.

Brief Description of the Drawing Figures

DETAILED DESCRIPTION OF CERTAIN EMBODIMENTS

Figure 1:
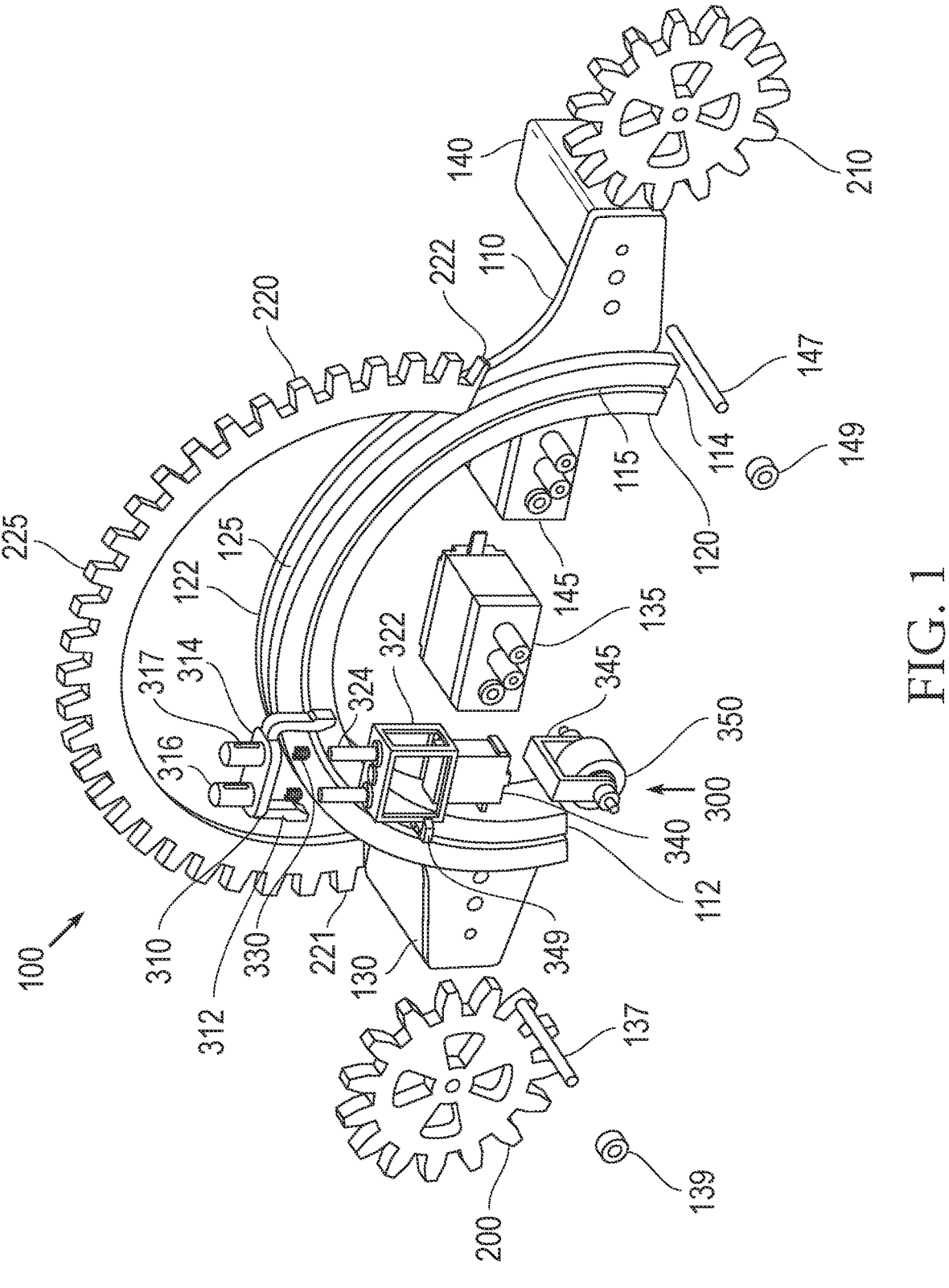
FIG. 1 is an exploded perspective view of an ultrasonic inspection device in accordance with one embodiment.

The present disclosure is directed to an ultrasound inspection device for pipes and more specifically, is directed to a half ring gear mechanism for ultrasound inspection capable of performing circumferential ultrasonic pipe inspection as well as being integrated with robotic crawlers and drones.

As described in more detail below, the ultrasound inspection device of the present disclosure is generally directed to a half ring housing enclosed within it a driven gear that is configured such that more than half of the driven gear can be removed and positioned external to the half ring housing. The device further includes a driving mechanism for controllably driving the inner driven gear. In one embodiment, the drive mechanism includes two motors and an ultrasonic testing (UT) probe. In this configuration, the two motors drive two gears that are meshing with the inner driven gear to enable continuous rotation.

Now turning to FIGS. 1-8 in which an ultrasonic inspection device 100 according to one embodiment is illustrated. As described herein, the ultrasonic inspection device 100 is configured to be placed around a pipe 10 for performing inspection and measurements thereof. The ultrasonic inspective device 100 can be described as being a cuff.

The ultrasonic inspection device 100 includes an arcuate shaped housing 110 that is sized and configured for placement about the pipe. 10. As illustrated and described herein, the arcuate shaped housing 110 is not placed in direct contact with the exterior surface of pipe 10. In the illustrated embodiment, the arcuate shaped housing 110 can have a semi-circular shaped and thus, can be alternatively described as being a half-ring housing 110. The arcuate length of the arcuate shaped housing 110 is, in one embodiment, at least 180 degrees.

The arcuate shaped housing 110 has a first end 112 and an opposite second end 114 that is generally opposite the first end 112 and therefore, the first end 112 is positioned on one side of the pipe 10, while the second end 114 is positioned on the opposite side of the pipe 10. The arcuate shaped housing 110 is defined by a first face 120 and an opposite second face 122 with a slot or track 125 being defined therebetween. Given the shape of the arcuate shaped housing 110, the track 125 is also arcuate shaped. The track 125 is open at its opposite ends. The track 125 opens upwardly to allow free receipt of an object, described below, into the track 125.

As shown, the first and second ends 112, 114 can be in the form of a first lateral extension and a second lateral extension, respectively, to which other parts are mounted as discussed below.

The first face 120 of the housing 110 includes an arcuate guide slot 115 that is open at the two ends 112, 114 of the housing 110. The guide slot 115 can be formed centrally within the first face 120.

At the first end 112 (along the first lateral extension) of the arcuate shaped housing 110, there is a first motor housing 130 and similarly, at the second end 114 (along the second lateral extension) of the arcuate shaped housing 110, there is a second motor housing 140. With the first motor housing 130 there is a first motor 135 and within the second motor housing 140 there is a second motor 145. Any number of conventional motors can be used, such as, electric motors that can be powered by a battery. Thus, in the case of a battery powered motor, the battery can also be contained within the motor housing.

The first motor 135 is operatively coupled to a first drive shaft 137 that is driven (rotated) by operation of the first motor 135. The first drive shaft 137 extends outwardly from the first motor housing 130 in a direction toward the first face 120. As illustrated, the first drive shaft 137 can be oriented perpendicular to the face of the first motor housing 130. Similarly, the second motor 145 is operatively coupled to a second drive shaft 147 that is driven (rotated) by operation of the second motor 145. The second drive shaft 147 extends outwardly from the second motor housing 140 in a direction toward the first face 120. As illustrated, the first drive shaft 147 can be oriented perpendicular to the face of the second motor housing 140.

As mentioned, the ultrasonic inspection device 100 includes a drive mechanism. The drive mechanism includes a first (driving) gear 200 and a second (driving) gear 210. The first gear 200 is operatively coupled to the first motor 135 and more particularly, is fixedly attached to the first drive shaft 137. The second gear 210 is operatively coupled to the second motor 145 and more particularly, is fixedly attached to the second drive shaft 147. Each of the first gear 200 and the second gear 210 can be a conventional circular toothed gear. The first and second motors 135, 145 are configured to operate independently from one another; however, the two motors 135, 145 are preferably in communication with a master controller that controls operation of the two motors. The master controller can send control signals to the two motors 135, 145 to control operation thereof and in normal operation, the two motors 135, 145 operate together and rotate in the same direction. For example, the two motors 135, 145 can both rotate in a clockwise direction resulting in a first driving action as described below, or alternatively, the two motors 135, 145 can both rotate in a counterclockwise direction resulting in second driving action. The speeds (RPM) of the two motors 135, 145 are controlled and preferably, the speeds of the two motors 135, 145 are the same.

A bearing 139 can be provided and coupled to the first drive shaft 137 along the exterior of the first driving gear 200. A bearing 149 can be provided and coupled to the second drive shaft 147 along the exterior of the second driving gear 210.

In addition, the first and second gears 200, 210 are positioned so that they are aligned with the center of the track 125. In other words, the first and second gears 200, 210 lies in a common plane that passes through the center of the track 125.

Another component of the drive mechanism is the driven gear 220. The driven gear 220 is configured to be operatively coupled to the first and second gear 200, 210 such that movement of the first and second gears 200, 210 is translated into movement of the driven gear 220. In other words, rotation of the first and second gears 200, 210 causes the driving of the driven gear 220. The driven gear 220 is disposed within the arcuate shaped track 125 and has a complementary shape so that it can be driven within the track 125 in an arcuate direction. Accordingly, the driven gear 220 has an arcuate shape and in particular, the driven gear 220 can comprise an arcuate shaped gear that has an arcuate length greater than 180 degrees and more particularly, it can have an arcuate length of about 198 degrees (in this case 45% of the circumference of the driven gear 220 has been eliminated). The arcuate length of the track 125 is thus less than the arcuate length of the driven gear 220 in which case when inserted into the track 125, the opposing ends 221, 222 of the driven gear 220 extend beyond the ends of the track 125. As described below, this construction of the driven gear 220 allows the driven gear 220 to be driven 360 degrees around the pipe 10. It will be understood that the arcuate length of the driven gear 220 can be less than or greater than 198 degrees so long as during 360 degree movement thereof, the teeth of the driven gear 220 mesh at least with one of the driving gears.

The driven gear 220 has outwardly facing teeth 225 that extend along the complete arcuate length of the driven gear 220. The teeth 225 are configured (sized and spaced) so that they mesh with the teeth of the first and second gears 200, 210 (at opposite ends of the housing) to allow the driven gear 220 to be driven in an arcuate manner when the first and second gears 200, 210 rotate under action of the first and second motors 135, 145. As will be described herein and as shown in the figures, during operation one or both of the first and second gears 200, 210 meshes with the driven gear 220 as the driven gear 220 moves circumferentially about the pipe 10. As viewed from the first face (e.g., view of FIG. 2), when the first and second gears 200, 210 are rotated in clockwise directions, the driven gear 220 is driven in the opposite direction in that the driven gear 220 rotates in a counterclockwise direction. Conversely, as viewed from the first face, when the first and second gears 200, 210 are rotated in counterclockwise directions, the driven gear 220 is driven in the opposite direction in that the driven gear 220 rotates in a clockwise direction. In any event, as described herein, rotation of the driven gear 220 in either the clockwise or counterclockwise directions allows the driven gear 220 to travel 360 degrees about the pipe 10.

As shown in the figures, the half-ring shape of the driven gear 220 permits it to be driven circumferentially around the complete circumference of the pipe 10 given the constructions of the parts and operation of the motors. As shown, the housing 110 remains in a first position about the pipe 10 and is intended to remain stationary and has coverage over a first section (e.g., first half) of the pipe 10. It is the driven gear 220 that moves relative to both the housing 110 and the pipe 10 and provides coverage of the second section (e.g., second half) of the pipe 10. It is therefore possible to completely drive the driven gear 220 completely around (360 degrees) the pipe 10 to perform the inspection.

The drive mechanism also functions as a carrier for the ultrasonic testing equipment and more particularly, the driven gear 220 carries an ultrasonic testing (UT) probe assembly 300. The UT probe assembly 300 is at a fixed location along the driven gear 220 and thus, as the driven gear 220 is driven and moves along its arcuate pathway, the UT probe assembly 300 moves likewise. In the illustrated embodiment, the UT probe assembly 300 is fixed at a center location (arcuate midpoint) of the driven gear 220. However, it will be appreciated that the UT probe assembly 300 can be placed at other locations along the driven gear 220.

In the illustrated embodiment, the UT probe assembly 300 comprises a gear/UT coupler 310 that is attached to the driven gear 220 using conventional techniques, such as the use of fasteners (screws). As shown, the gear/UT coupler 310 is attached to a first face (first side) of the driven gear 220. The gear/UT coupler 310 can be generally U-shaped and includes first and second legs 312 connected with a crossbar 314. The gear/UT coupler 310 also includes a pair of hollow extrusions (extensions) 316 that protrude outwardly from the cross bar 314 and the crossbar 314 includes two openings that form entrances into the hollow interior of the pair of hollow extrusions 316. The pair of hollow extrusions 316 can have cylindrical shapes as shown; however, other shapes can be equally used. Each of the hollow extrusions 316 can have a pair of slots 317 formed along sides thereof. The slots 317 can be linear in nature. As shown, the pair of hollow extrusions 316 are located radially beyond the teeth 225.

Since the driven gear 220 is disposed within the track 125 and the gear/UT coupler 310 is located outside the track 125 along the first face 120 of the housing 110, the fasteners connecting the gear/UT coupler 310 to the driven gear 220 pass through the arcuate guide slot 115 in the housing 110. As the driven gear 220 is driven in the track 125 and the carried gear/UT coupler 310 moves therewith, the fasteners move within the arcuate guide slot 115. The gear/UT coupler 310 can seat against or be in close proximity to the first face 120 of the housing 110. The gear/UT coupler 310 is position, as shown, such that the two legs 312 face inward toward a center of the circle defined, in part, by the arcuate shaped housing 110, while the pair of hollow extrusions 316 face outward therefrom.

The UT probe assembly 300 also includes a motor housing 320 that is biased relative to the gear/UT coupler 310. The motor housing 320 can have a cage like structure in that it has a hollow frame 322 and includes a pair of protrusions 324 that are configured to be received within the pair of hollow extrusions 316. Accordingly, the pair of protrusions 324 has complementary shapes and sizes for reception within the hollow spaces of the pair of hollow extrusions 316. In the illustrated embodiment, each protrusion 324 can have a cylindrical shape like the cylindrical shape of the extrusion 316. The pair of protrusions 324 are spaced apart and are parallel to one another and similarly, the pair of hollow extrusions 316 are spaced apart and are parallel to one another.

The biasing of the motor housing 320 is due to the presence of a pair of springs 330 that are disposed between the pair of protrusions 324 and the inside of the hollow extrusions 316. In the extended state (virgin, uncompressed state), the springs push the motor housing 320 away from the gear/UT coupler 310. As the motor housing 320 is pushed toward the gear/UT coupler 310, as by an applied force, the springs 330 compress and store energy. The springs 330 can be coil springs that seat between the protrusions 324 and the extrusions 316.

The movement of the motor housing 320 relative to the gear/UT coupler 310 can be restricted and controlled by use of fasteners that act to couple the slots 317 of the hollow extrusions 316 to the motor housing 320 to limit the movement of the motor housing 320 in the vertical (axis) direction. For example, screws and nuts can be used to limit such movement and the protrusions 324 can have holes near their distal ends that can receive the fasteners that pass through the slots 317. The protrusions 324 slide in the extrusions.

The cage of the motor housing 320 is hollow and is configured to receive a motor 340. The motor 340 can be in the form of a servo motor that is received within the cage and coupled thereto. For example, fasteners can be used to attach the motor 340 to the cage. The first and second legs 312 of the gear/UT coupler 310 can be disposed along the sides of the cage of the motor housing 320. The motor 340 is preferably battery powered and includes a drive shaft that is driven by the motor. The drive shaft can have a short length as shown. A motor housing lock 349 can be provided to ensure that motor 340 remains securely held within the motor housing 320. The motor housing lock 349 can generally be in the form of a bracket like structure as shown.

The UT aspect and functionality of the equipment is achieved by a UT probe 350 that is operatively coupled to the motor 340 and more particularly, the UT probe 350 is coupled to the drive shaft 342 such that incremental movement of the drive shaft 342 causes incremental movement (adjustment) of the UT probe 350. The UT probe 350 comprises an ultrasonic wheel probe. The wheel probe is an ultrasonic transducer assembly that allows rolling contact of a transducer over a surface.

Figure 2:
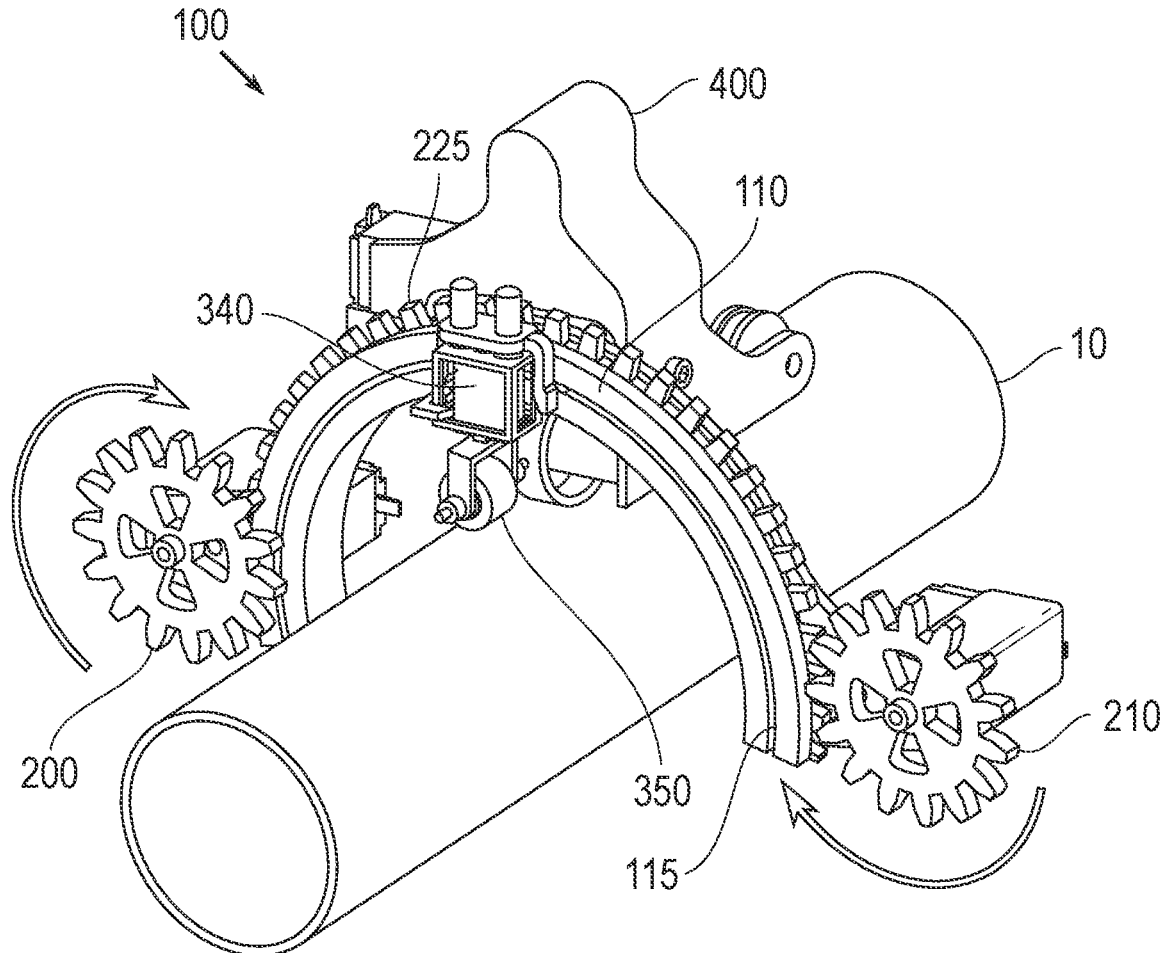
FIG. 2 is a perspective view of the ultrasonic inspection device shown in relation and in contact with a pipe showing a driven gear in a first position.
Figure 3:
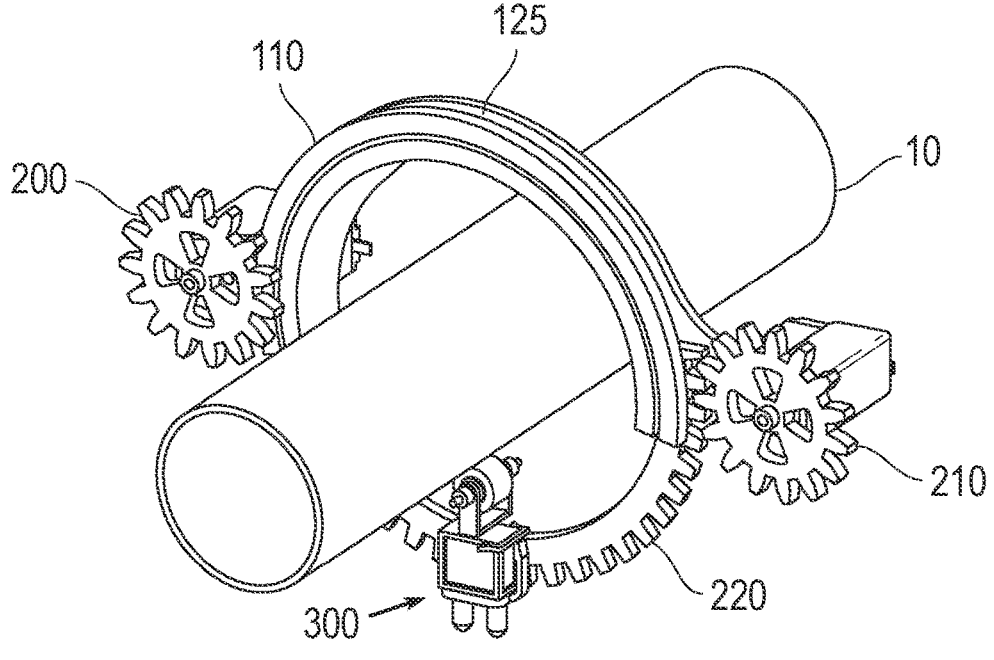
FIG. 3 is a perspective view of the ultrasonic inspection device of FIG. 2 showing the driven gear in a second position.

The UT probe 350 is coupled to the drive shaft 342 with a UT probe adapter 345. The UT probe adapter 345 is a U-shaped structure defined by a pair of legs with a crossbar. The UT probe 350 is disposed between the pair of legs and coupled thereto with an axle that permits the UT probe 350 to freely rotate. The crossbar of the UT probe adapter 345 comprises the structure that is fixedly coupled to the motor drive shaft and therefore, when the drive shaft is rotated, the UT probe adapter 345 rotates and likewise the UT probe 350 itself rotates. It will be appreciated that the motor 340 is thus utilized to change the direction of the inspection since the inspection could be along the circumference of the pipe 10 as well as along its longitude. In FIGS. 1-2, the UT (wheel) probe 350 is oriented for traversing the circumference of the pipe 10. To traverse in the longitudinal direction, the UT (wheel) probe 350 would be rotated 90 degrees.

As will be understood by one skilled in the art, the springs 330 apply a force to the motor housing 320 to cause the UT (wheel) probe 350 to be pressed into contact with the pipe 10 to ensure good contact between the UT (wheel) probe 350 and the surface of the pipe 10. The springs 330 also permit the device 100 to be used with different sizes of pipes 10 since for larger sized pipes 10, the springs 330 can compress to permit the UT (wheel) probe 350 to be in contact with the surface of the larger pipe 10. In any event, the springs 330 apply a force to the UT (wheel) probe 350 that ensures that the UT (wheel) probe 350 remains in contact with the pipe surface.

Combination of the Ultrasonic Inspection Device 100 With a Crawling Vehicle 400

Figure 5:
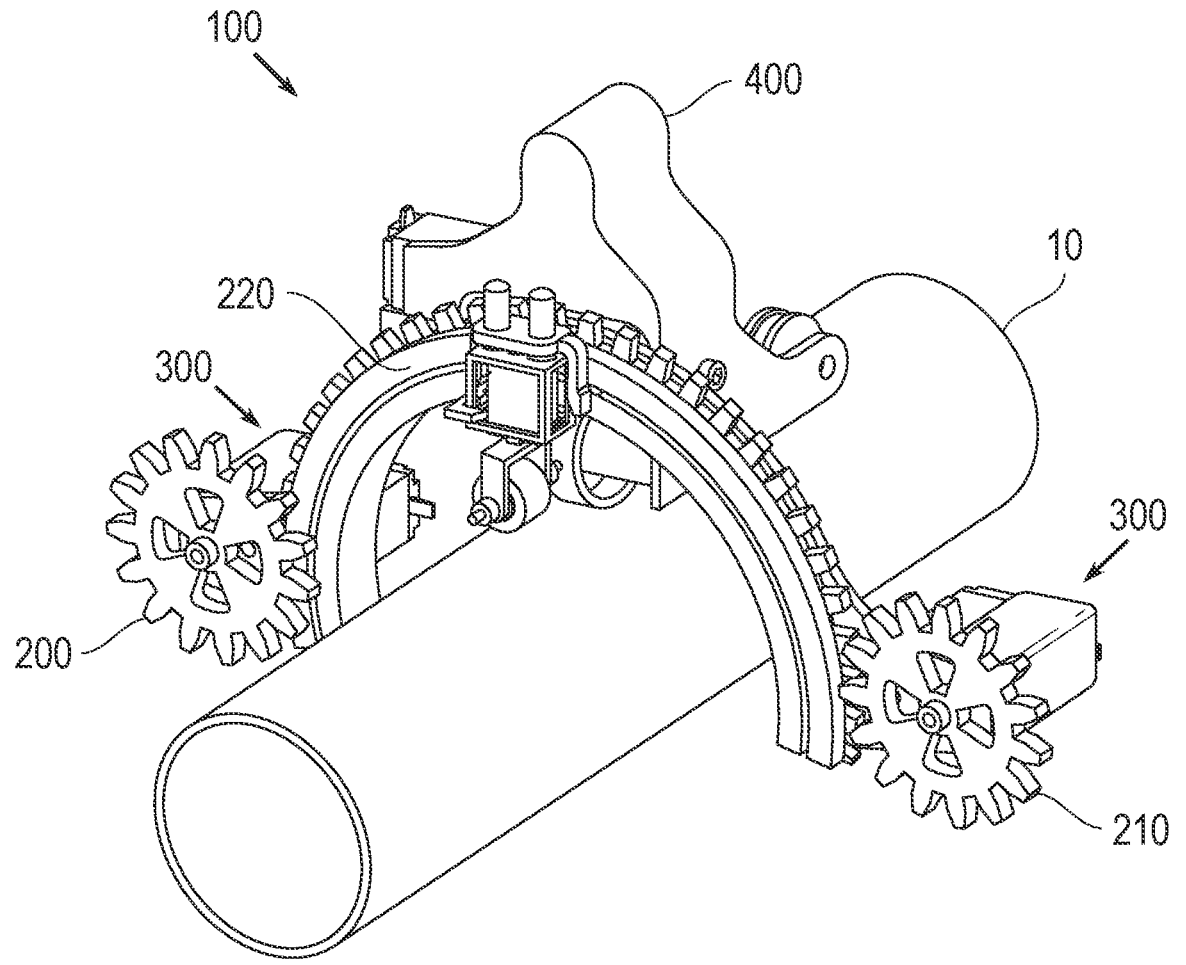
FIG. 5 is a perspective view of the ultrasonic inspection device in combination with a crawling vehicle.
Figure 6:
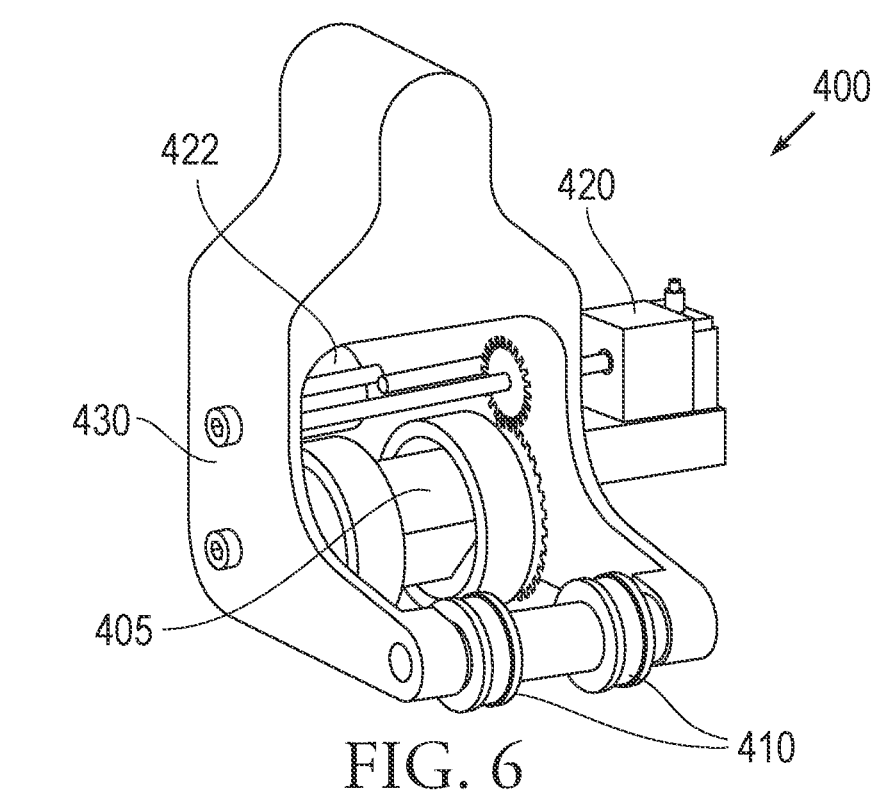
FIG. 6 is a perspective view of the crawling device.

FIGS. 5 and 6 illustrate the combination of the ultrasonic inspection device 100 with the crawling vehicle 400 to move the ultrasonic inspection device 100 along the pipe 10 or tub. This combination enables the scan of the entire pipe 10 or tube since it enables the lateral and circumferential movement of the ultrasonic inspection device 100. The illustrated crawling vehicle 400 features magnetic wheels 410 to be attached on ferromagnetic surfaces as described in more detail below.

The coupling between the crawling vehicle 400 and the ultrasonic inspection device 100 can be achieved using any number of traditional techniques, including detachable coupling mechanisms that fixedly attach the two to one another. The crawling vehicle 400 can be coupled to the ultrasonic inspection device 100 near the center of the half ring shaped housing 110.

The crawling vehicle 400 includes a large main wheel 405 with switchable magnetism to enable easy attachment and detachment of the vehicle 400 to the target surface (pipe 10), two front magnetic wheels 410 with a weak magnetism to balance and prevent the crawling vehicle 400 and ultrasonic inspection device 100 combination from tipping which is critical to preserve the cuff orientation. The crawling vehicle 400 also features two motors. A first motor 420 is considered to be a driving motor to drive the crawling vehicle 400 forward and backward and a second motor 422 is to turn and switch off the magnetism of the main wheel 405. Finally, the crawling vehicle 400 includes a chassis 430 that houses all the parts together.

The working principles of the crawling vehicle 400 are as follows: (1) the magnetism of the large switchable magnet is switched on by the action of the second motor 422 (switching motor); (2) the combined crawling vehicle 400 and the device 100 is moved to the pipe until all three of the magnetic wheels are engaged with the surface; and (3) the inspection process begins and can follow any of the scan paths described herein.

Figure 7:
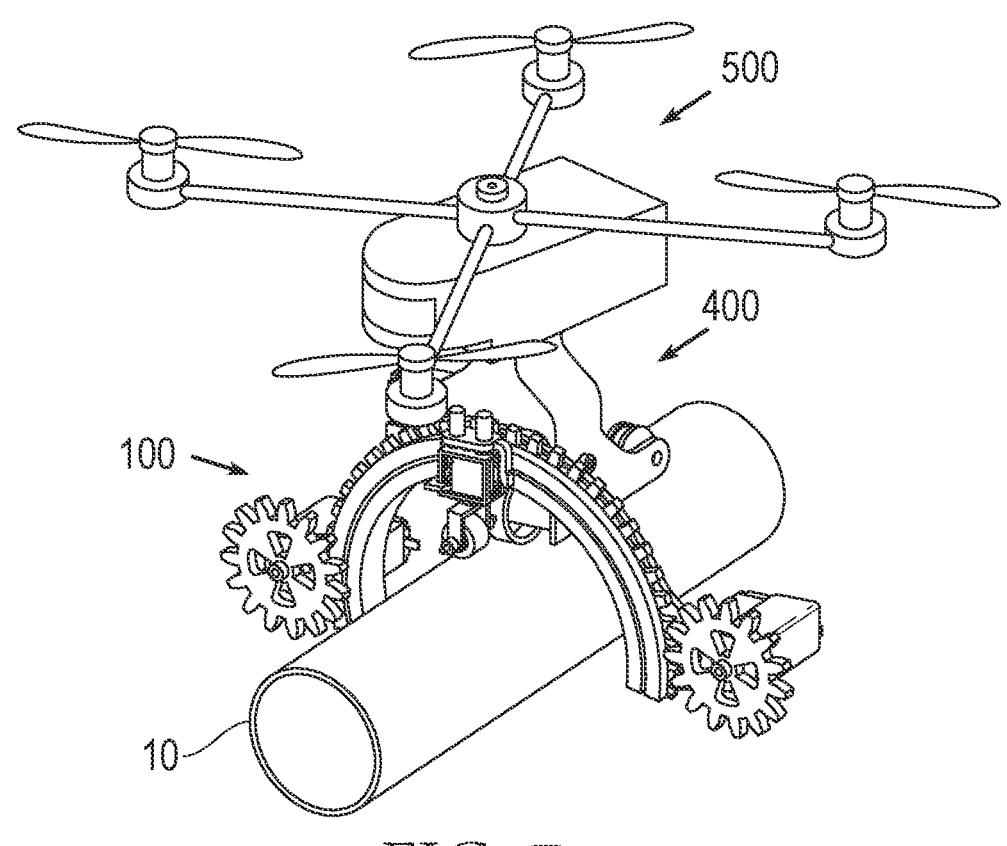
FIG. 7 is a perspective view of the integration of the crawling device and ultrasonic inspection device with a drone.
Figure 8:
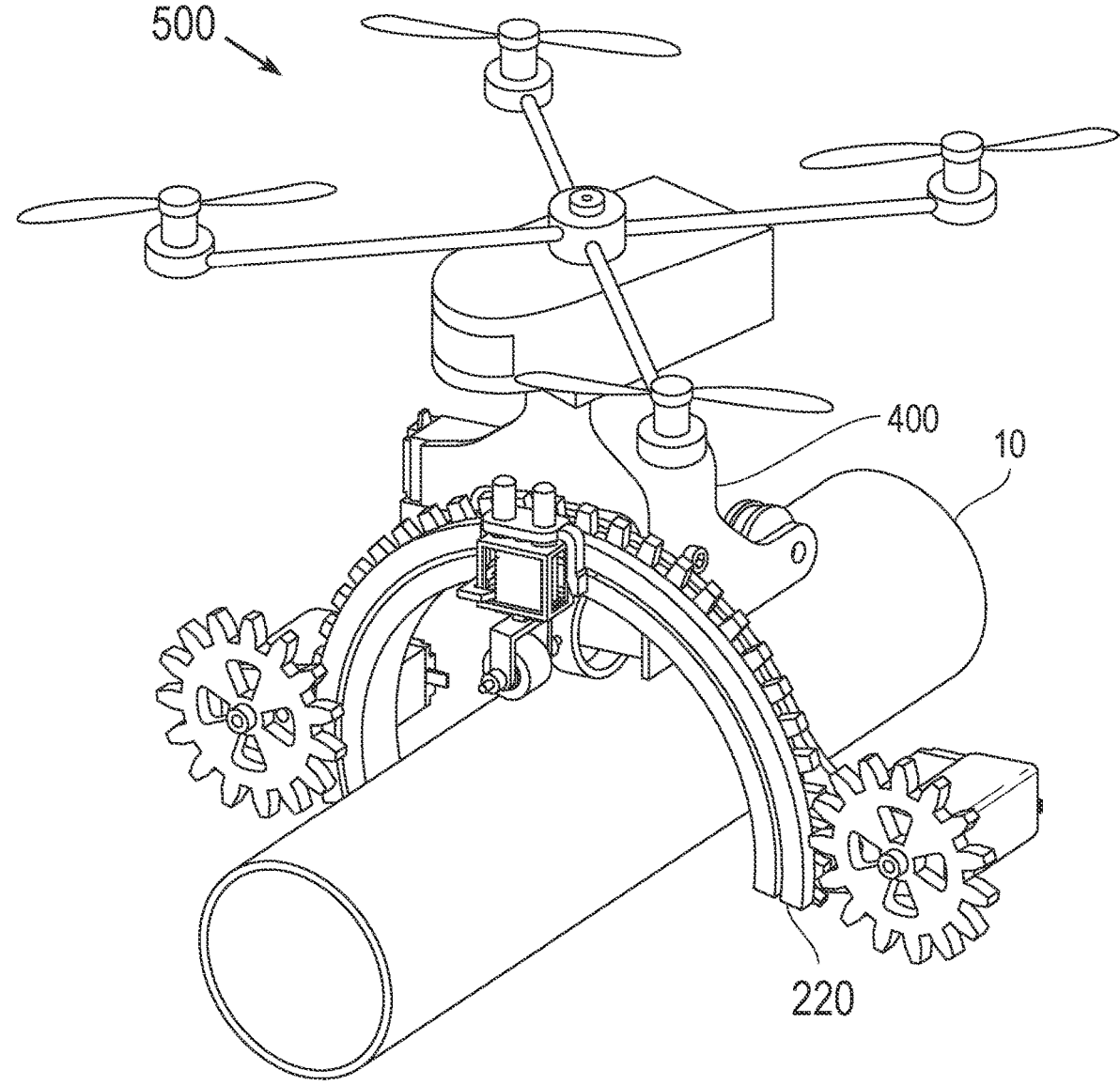
FIG. 8 is another perspective view of the integration of the crawling device and ultrasonic inspection device with a drone.

Now referring to FIGS. 7-8, the design of the crawling vehicle 400 can be integrated with a drone 500. More specifically, the drone 500 can be securely coupled to the crawling vehicle 400 which is itself securely coupled to the device 100 to permit delivery of the vehicle 400 and device 100 to the target pipe 10. The two front magnetic wheels 410 can be utilized to land the drone 500 on the ferromagnetic pipe 10 as well as for driving the drone 500, and the device 100, along the pipe 10.

Operation of the Ultrasonic Inspection Device 100

The ultrasonic inspection device 100 is based on two main working principles, namely, the engagement process and the inspection process. In the engagement process, the (half-ring) driven gear 220 is coupled about the pipe 10 to be inspected given that the outer diameter of the pipe 10 is less than the inner diameter of the driven gear 220. The attachment of the device 100 to the pipe 10 can be done with an axillary system to the driven gear 220 through magnetism if the pipe 10 is ferromagnetic or through applied pressure if it is non-ferromagnetic. There are other method of attachment including one described below with respect to an alternative embodiment of the device.

Once the engagement process is completed, the springs 330 in the UT probe assembly 300 press against the pipe 10 and this action serves two purposes. The first is to ensure that the pipe 10 or tube is centered within the inner diameter of the (half ring) housing 110 for proper circumferential UT inspection. The second is to enable the testing of the pipes 10 or tubes with different diameters given that these diameters are less than the diameter of the (half ring) housing 110. In this process, the first and second motors 135, 145 initially rotate the first and second gears 200, 210 to rotate the driven gear 220 outside of the half ring shaped housing 110. The presence of a single UT probe assembly 300 means that the single probe (UT probe assembly 300) has to fully rotate 360 degrees in order to scan the entire diameter of the pipe 10. Since the same driven gear 220 is utilized for this rotation with 45% cut of its circumference (i.e., the driven gear 220 has an arcuate length of 198 degrees) that means that a single driving gear (first gear 200 or second gear 210) cannot drive the driven gear 220 360 degrees as the teeth of one single driving gear lose their meshing when the driving gear teeth reach the cut section of the driven gear 220. This complication is eliminated by the current design in which there are two driving gears 200, 210 and two motors 135, 145 at the two ends of the half ring shaped housing 110. In the disclosed configuration, at least one of the driving gears 200, 210 will be meshing with the driven gear 220 at every moment during its rotation.

The scanning rotation of the device 100 is as follows. As previously stated, the usage of one probe (UT probe assembly 300) means that the driven gear 220 has to rotate 360 degrees in order for the single probe (UT probe assembly 300) to entirely scan the diameter of the pipe 10. The first and second motors 135, 145 operate and rotate in the same direction to drive the driven gear 220 in a 360 degree circumferential path which enables continuous scan. This is especially of value to expedite the helical path scanning. The scanning paths along the entirety of the pipe 10 should be very similar. Thus, after the engagement process to the pipe 10, the driven gear 220 is rotated by 360 degrees in either a clockwise or counterclockwise direction to enable the probe in the UT probe assembly 300 to scan the entire pipe diameter.

The direction of the UT inspection for the entire pipe 10 if it is along the circumferential or the longitude, or at an angle for the helical inspection process (will be discussed later) of the pipe 10 should be specified by rotating the UT probe 350 using the servo motor 340 in the UT probe assembly 300. Following this step, the UT inspection process can start by turning on the first and second motors 135, 145 which in turn will rotate the first and second (driving) gears 200, 210 that mesh with the teeth of the driven gear 220. In the case of circumferential testing, the driven gear 220 will move along the pipe diameter and the measurement of the pipe thickness will be taken along it. If the inspection is meant to be taken along the pipe longitude, the (servo) motor 340 will adjust the orientation of the UT probe 350 first so that it faces the longitude of the pipe 10. Following this step, the first and second motors 135, 145 should be utilized to rotate the UT probe 350 to the desired clock position along the pipe 10 or tube by the rotation of the driven gear 220 under action of the rotating first and second gears 200, 210. Finally, the entire device 100 (cuff mechanism) is moved along the pipe 10 using suitable means including those discussed herein to get a line UT inspection along the pipe 10.

With intensive testing, the entire area of the pipe 10 or tube can be inspected which is known as C-scan. In the case of the circumferential UT testing, the UT probe 350 is rotated 360 degrees as discussed above. This process is repeated until the entire area of the pipe 10 has been inspected. In the case of the longitudinal inspection, the entire device 100 is moved from the start of the area of the pipe 10 intended for inspection until its end. This will result in one line of measurement along the pipe. Following this movement, the first and second motors 135, 145 are turned on to rotate the UT probe 350 slightly and the device 100 is moved back laterally to the start of the area resulting in another single line reading. Following this, the UT probe 350 is again rotated slightly and the device 100 moves along the pipe 10 again. This process is repeated until the entire pipe 10 is inspected. Finally, the scan can be done helically by angling the UT probe 350 slightly and continuously rotating the UT probe and moving the device 100 slowly to the side. The resolution of the scan can be changed based on the distance between each test as well as the accuracy of the motors. The paths for area scanning are illustrated in the figure below.

Figures 4A, 4B, 4C:
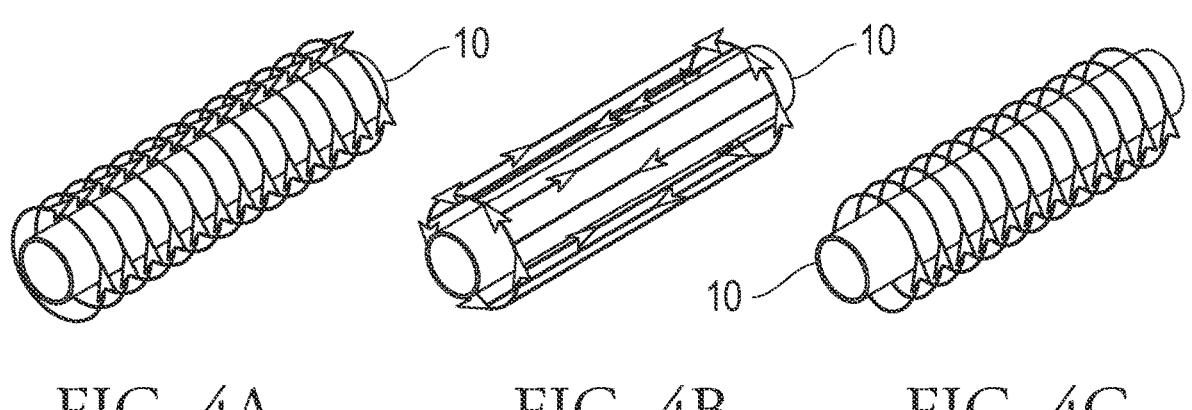
FIG. 4A shows a path for circumferential UT testing.
FIG. 4B shows a longitudinal inspection path for a UT probe.
FIG. 4C shows a helical path for the UT probe.

FIGS. 4A-4C illustrate exemplary paths of the UT probe 350 for area scanning. FIG. 4A shows the path for circumferential UT testing where the single UT probe 350 (FIG. 1) is rotated circumferentially along the pipe 360 degrees and then the device, including the UT probe 350, is moved sideways a short distance and another 360 degrees rotation of the UT probe 350 is completed. This process is repeated until the entire area of the pipe 10 is scanned. FIG. 4B shows the longitudinal inspection path for UT probe 350 where the UT probe 350 scans laterally across the pipe 10 then rotated slightly along the pipe diameter then scans the pipe laterally again by moving back to the starting point then rotate slightly along the pipe diameter and continue the process until the inspection is done. FIG. 4C shows the helical path where the UT probe 350 is continuously rotated at an angle with a slow and continuous sideways movement of the device 100 along the pipe 10.

Finally, before removing the device 100 from the pipe, the driven gear 220 should be rotated to a position in which it is at least substantially enclosed within the half ring housing 110 to allow the device 100 to be easily removed from the pipe 10.

It will also be appreciated that wire guiding rings or brushed slip rings could be installed on the driven gear 220 for the continuous rotation of the mechanism around the pipe 10 while avoiding the risk of wire entanglement of the wires or wrapping them around the pipe 10.

The movement of the device 100 around and along the pipe may introduce wheel slippage and inertial measurement drift. Accordingly, accurate localization of the UT probe 350 will be compromised. It is essential to keep track of the accurate localization of the robot that moves the device 100 and the UT probe assembly 300 while performing B-Scan and C-Scan. One solution to resolve the drift and slippage problem is to anchor a stationary referencing element on the pipe 10 when the robot is deployed on the pipe 10. The reference station could attach to the pipe using switchable magnets or any other attaching mechanisms. Once the reference station is fixated on the pipe, its fixed position can be used by the robot as a localization reference. For example, the station can be equipped with a laser-beam that emits rays along the longitudinal axis of the pipe. When the robot moves helically around the circumference of the pipe, it can reset its circumference localization once it crosses the laser beam emitted by the reference station. Alternatively, the laser beam can be installed on the robotic crawler emitting laser beam towards the longitudinal direction of the docking station. When the robot moves circumferentially, it can reset its angular position when the laser beam hits the reference station. Moreover, time of flight of the laser beam can be used to measure the longitudinal crossed distance of the robot. In conclusion by using the laser beam, the robot localization drift and inaccuracy can be reset and improved which in turn will improve the accurate localization of the inspection measurement.

The ultrasonic inspection device 100 provides a number of features and advantages over conventional inspection devices. For example, the ultrasonic inspection device 100 does not need to complete engulf the pipe circumference to operate making it easier to engage with the pipe 10. The ultrasonic inspection device 100 also can be automated and designed to be lightweight in order for the integration with drones (e.g., drone 500) with capabilities of performing intensive scanning. Conventional methods involve heavy manual user involvements and contain heavy components which makes their integration with drone technologies especially very difficult. This is even more critical for the inspection of small pipes since they are typically placed in congested areas and generally drone size is typically correlated to its payload carrying capabilities which makes the conventional approach unusable. In addition, conventional technologies are designed to engulf the pipe circumference to perfume their operation.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

What is claimed is:

1. An ultrasonic inspection device for a pipe or tube comprising:

an arcate shaped housing having an arcuate shaped guide track, the arcuate shaped housing having a first end and an opposite second end spaced from the first end;

a first driving gear assembly disposed at the first end of the arcuate shaped housing, the first driving gear assembly including a first driving gear powered by a first motor;

a second driving gear assembly disposed at the second end of the arcuate shaped housing, the second driving gear assembly including a second driving gear powered by a second motor;

an arcuate shaped driven gear that movably travels within the arcuate shaped guide track about the pipe or tube and is engaged at all times with at least one of the first driving gear and the second driving gear to permit the arcuate shaped driven gear to be driven in a 360 degree path around the pipe or tube; and an ultrasonic testing (UT) probe assembly fixedly attached to the arcuate shaped driven gear and configured to move in unison with the arcuate shaped driven gear for direct contact with the pipe or tube for performing ultrasonic inspection of the pipe or tube.

2. The ultrasonic inspection device of claim 1, wherein each of the arcuate shaped housing and the arcuate shaped guide track has a C-shape.

3. The ultrasonic inspection device of claim 1, wherein an arcuate length of each of the arcuate shaped housing and the arcuate shaped guide track is 180 degrees.

4. The ultrasonic inspection device of claim 1, wherein an arcuate length of each of the arcuate shaped housing and the arcuate shaped guide track is less than 200 degrees.

5. The ultrasonic inspection device of claim 1, wherein first and second ends of the arcuate shaped guide track are open and the first and second driving gears are disposed radially outward of the driven gear.

6. The ultrasonic inspection device of claim 1, wherein an arcuate length of the arcuate shaped driven gear is greater than an arcuate length of the arcuate shaped guide track resulting in ends of the arcuate shaped driven gear extending beyond the first and second ends of the arcuate shaped guide track.

7. The ultrasonic inspection device of claim 1, wherein an arcuate length of the arcuate shaped driven gear is between 190 and 200 degrees and the arcuate shaped driven gear has outwardly facing teeth that are configured to mesh with outwardly facing teeth of each of the first driving gear and the second driving gear.

8. The ultrasonic inspection device of claim 1, wherein the arcuate shaped driven gear has a C-shape and the first and second driving gears comprise circular toothed gears, the arcuate shaped housing has an arcuate length of less than 190 degrees.

9. The ultrasonic inspection device of claim 1, wherein the ultrasonic testing (UT) probe assembly is fixedly attached to the arcuate shaped driven gear by a coupler and the ultrasonic testing (UT) probe assembly includes a spring biased motor housing that is biased relative to the coupler and contains a servo motor that is coupled to a rotatable UT probe.

10. The ultrasonic inspection device of claim 9, wherein the coupler is coupled to the arcuate shaped driven gear through an arcuate slot that is formed in one face of the arcuate shaped housing.

11. The ultrasonic inspection device of claim 10, wherein the coupler includes a pair of hollow extrusions and the motor housing includes a cage that has a pair of protrusions that are received within the pair of hollow extrusions with a pair of springs being disposed between the pair of protrusions and the pair of hollow extrusions.

12. The ultrasonic inspection device of claim 9, wherein the servo motor has a drive shaft and the UT probe has an adapter that is fixedly attached to the drive shaft to permit rotation of the UT probe, the UT probe comprising an ultrasonic wheel probe that rotates on an axle that is coupled to the adapter.

13. The ultrasonic inspection device of claim 1, further including a crawling vehicle that is coupled to the arcuate shaped housing for controllably moving the ultrasonic inspection device along the pipe or tube.

14. The ultrasonic inspection device of claim 13, wherein the crawling vehicle includes a pair of magnetic wheels and a main wheel with switchable magnetism and a driving motor that causes movement of the crawling vehicle.

15. The ultrasonic inspection device of claim 13, further including a drone that is configured to dock with the crawling vehicle to transport and deliver the crawling vehicle and the ultrasonic inspection device to the pipe or tube.

16. An ultrasonic inspection device for a pipe or tube comprising: an arcuate shaped housing having an arcuate shaped guide track that is open along a top of the arcuate shaped housing, the arcuate shaped housing having a first lateral extension at a first end thereof and a second lateral extension at an opposite second end that is spaced from the first end; a first driving gear assembly coupled to the first lateral extension of the arcuate shaped housing, the first driving gear assembly including a first driving gear powered by a first motor;

a second driving gear assembly coupled to the second lateral extension of the arcuate shaped housing, the second driving gear assembly including a second driving gear powered by a second motor;

an arcuate shaped driven gear that movably travels within the arcuate shaped guide track about and relative to the pipe or tube and is engaged at all times with at least one of the first driving gear and the second driving gear to permit the arcuate shaped driven gear to be driven in a 360 degree path around the pipe or tube, wherein an arcuate length of the arcuate shaped driven gear is greater than 180 degrees; and an ultrasonic testing (UT) probe assembly fixedly and directly attached to the arcuate shaped driven gear such that the ultrasonic testing (UT) probe assembly moves in unison with the arcuate shaped driven gear and configured for direct contact with the pipe or tube for performing ultrasonic inspection of the pipe or tube;

wherein in a first position, the arcuate shaped driven gear is disposed substantially within the arcuate shaped guide track such that the arcuate shaped driven gear is exposed and protrudes above the arcuate shaped housing and is driven up and across a top of the acuate shaped housing and the ultrasonic testing (UT) probe assembly lies between the first and second ends and above the arcuate shaped housing and in a second position, the arcuate shaped driven gear is disposed substantially outside the arcuate shaped guide track and the ultrasonic testing (UT) probe assembly lies outside of the arcuate shaped housing.

17. The ultrasonic inspection device of claim 16, wherein the ultrasonic testing (UT) probe assembly is fixedly attached to the arcuate shaped driven gear by a coupler and the ultrasonic testing (UT) probe assembly includes a spring biased motor housing that is biased relative to the coupler and contains a servo motor that is coupled to a rotatable UT probe.

18. The ultrasonic inspection device of claim 17, wherein the coupler is coupled to the arcuate shaped driven gear through an arcuate slot that is formed in one face of the arcuate shaped housing, thereby permitting the arcuate shaped driven gear to lie within the arcuate shaped guide track, while the UT probe lies outside of the arcuate shaped driven gear.

* * * * *